(12) United States Patent
Okazaki

(10) Patent No.: US 7,755,983 B2
(45) Date of Patent: Jul. 13, 2010

(54) OPTICAL DISC REPRODUCING APPARATUS AND RECORDING MEDIUM

(75) Inventor: Takashi Okazaki, Kumagaya (JP)

(73) Assignees: Sanyo Electric Co., Ltd., Osaka (JP); Sanyo Semiconductor Co., Ltd., Ora-gun, Gunma (JP)

( * ) Notice: Subject to any disclaimer, the term of this patent is extended or adjusted under 35 U.S.C. 154(b) by 428 days.

(21) Appl. No.: 11/858,019

(22) Filed: Sep. 19, 2007

(65) Prior Publication Data
US 2008/0074961 A1 Mar. 27, 2008

(30) Foreign Application Priority Data
Sep. 21, 2006 (JP) .............. 2006-256161

(51) Int. Cl.
G11B 7/085 (2006.01)
(52) U.S. Cl. ............... 369/30.23; 369/47.12; 369/47.21
(58) Field of Classification Search ............. 369/30.23, 369/47.11, 124.07, 47.12, 59.25, 128, 47.21; 386/95, 125; 714/784, 763, 758; 711/111, 711/103; 360/77.02, 77.05
See application file for complete search history.

(56) References Cited
U.S. PATENT DOCUMENTS
5,625,611 A * 4/1997 Yokota et al. ............. 369/47.12
5,633,847 A * 5/1997 Masuda et al. ............. 369/47.21

FOREIGN PATENT DOCUMENTS
| JP | 11-143644 | 5/1999 |
|---|---|---|
| JP | 2003-330623 | 11/2003 |
| KR | 2003-0063695 | 7/2003 |

OTHER PUBLICATIONS

Korean Patent Office, Office action for Application No. 10-2007-0095654, Mail date of Oct. 30, 2008.

* cited by examiner

Primary Examiner—Ali Neyzari
(74) Attorney, Agent, or Firm—SoCal IP Law Group LLP; Steven C. Sereboff; John E. Gunther

(57) ABSTRACT

An optical disc reproducing apparatus comprising: a buffer memory configured to store data read from sectors of an optical disc when information is reproduced; a controlling unit configured to cause the buffer memory to store first data read from a first sector and second data read from a second sector other than the first sector when the first sector of the sectors is designated; and an output unit configured to output the first data stored in the buffer memory to a processing circuit configured to reproduce the information when the first sector of the sectors is designated, and thereafter output the second data stored in the buffer memory to the processing circuit when the second sector of the sectors is designated.

7 Claims, 8 Drawing Sheets

OPTICAL DISC REPRODUCING APPARATUS AND RECORDING MEDIUM

CROSS-REFERENCE TO RELATED APPLICATION

This application claims the benefit of priority to Japanese Patent Application No. 2006-256161, filed Sep. 21, 2006, of which full contents are incorporated herein by reference.

BACKGROUND OF THE INVENTION

1. Field of the Invention

The present invention relates to an optical disc reproducing apparatus and a recording medium.

2. Description of the Related Art

At present, an optical disc apparatus is prevailing that reads data recorded on an optical disc (a CD (Compact Disc), a DVD (Digital Versatile Disc), etc.) based on an instruction signal that a host computer, etc., receives to execute reproducing of information, and outputs the host computer, etc. Referring to FIGS. 9 and 10, description will be given below for transmission, reception, etc., of data between a host computer 101 and an optical disc apparatus 100. FIG. 9 is a simplified block diagram of an example of the configuration of the optical disc apparatus 100. FIG. 10 is a diagram of a sector cluster (sectors X(0) to W(n)) that is the unit of reproducing or recording of the information, disposed on a track formed in a spiral on an optical disc 102.

When the host computer 101 reproduces the information based on data recorded in, for example, the sectors X(0) to X(2) on the optical disc 102, the host computer 101 transmits an instruction signal to instruct to read the data recorded in the sector X(0) at the head to obtain information indicating the data length and the header of the data generally recorded on the optical disc 102.

When a microcomputer 103 of the optical disc apparatus 100 receives the instruction signal from the host computer 101, the microcomputer 103 transmits a control signal to a servo controlling unit 105 to cause a laser light beam emitted by an optical pickup 104 to be applied to the sector X(0) that the instruction signal designates. The servo controlling unit 105 applies a controlling voltage to a thread mechanism and an actuator that are not shown based on the control signal and, thereby, moves the optical pickup 104 in the radial direction (seeking operation). As a result, the track on which the sector X(0) is disposed and the optical pickup 104 face each other on the optical axis. Therefore, a reflected light beam of the laser light beam that is applied to pits indicating data recorded on the sector X(0), enters the optical pickup 104. A signal corresponding to the light amount of the reflected light beam of the laser light beam from the optical pickup 104, is applied with a predetermined calculating process in a signal processing unit 107. A buffer memory 106 stores the data obtained as the result of the calculating process, etc., (that is, data recorded in the sector X(0)). When the microcomputer 103 determines that data indicating the address of the sector X(0) is present in the data stored by the buffer memory 106, the microcomputer 103 reads the data from the buffer memory 106 and transmits the data to the host computer 101.

The host computer 101 applies a predetermined reproducing process to the data from the optical disc apparatus 100 and, thereby, obtains the information on the data length and the header and, for example, reproduces music information, image information, etc. The host computer 101 transmits an instruction signal that designates the sectors X(1) and X(2) to the optical disc apparatus 100 to read data recorded in the sectors X(1) and X(2) following the sector X(0).

The microcomputer 103 of the optical disc apparatus 100 transmits a control signal to a servo controlling unit 105 to cause the laser light beam emitted from the optical pickup 104 to be incident on the sectors X(1) and X(2) that the instruction signal designates based on the instruction signal from the host computer 101. The servo controlling unit 105 applies a controlling voltage to the above thread mechanism and the actuator based on the control signal and, thereby, moves again the optical pickup 104 in the radial direction. By repeating the above processes, the data recorded in the sectors X(1) and X(2) is transmitted to the host computer 101. As a result, based on the data recorded in the sectors X(1) and X(2) following the sector X(0), reproduction of music information, reproduction of image information, etc., are executed.

In this manner, in a conventional optical disc apparatus 100, the optical pickup 104 is moved in the radial direction to a sector designated by an instruction signal every time the instruction signal is received from the host computer 101, and the data recorded in the sector is read (see, for example, Japanese Patent Application Laid-Open Publication No. 2003-330623 and Japanese Patent Application Laid-Open Publication No. 1999-143644).

However, because the optical pickup is moved to a sector designated by an instruction signal every time the instruction signal is received from the host computer, the time taken for the moving process and the time taken for the processing of the signal after the move are necessary. Therefore, the time necessary for the optical disc apparatus to read the data may be long. As a result, for example, transmission of data from the optical disc apparatus to the host computer is delayed. Therefore, problems may arise that the reproducing process in the host computer can not be executed continuously, etc. Therefore, a user who uses optical discs may feel inconvenience.

SUMMARY OF THE INVENTION

An optical disc reproducing apparatus according to an aspect of the present invention, comprises: a buffer memory configured to store data read from sectors of an optical disc when information is reproduced; a controlling unit configured to cause the buffer memory to store first data read from a first sector and second data read from a second sector other than the first sector when the first sector of the sectors is designated; and an output unit configured to output the first data stored in the buffer memory to a processing circuit configured to reproduce the information when the first sector of the sectors is designated, and thereafter output the second data stored in the buffer memory to the processing circuit when the second sector of the sectors is designated.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

When a first sector of sectors of an optical disc is designated, a buffer memory is caused to store first data read from the first sector and second data read from a second sector other than the first sector. Therefore, when the second sector is designated after the first data has been outputted to a processing circuit that executes reproduction of information, the second data already stored in the buffer memory is outputted to the processing circuit and, thereby, a reproduction process of the information in the processing circuit is executed without any delay.

===Entire Configuration of Optical Disc Apparatus 1===

Figure 1:
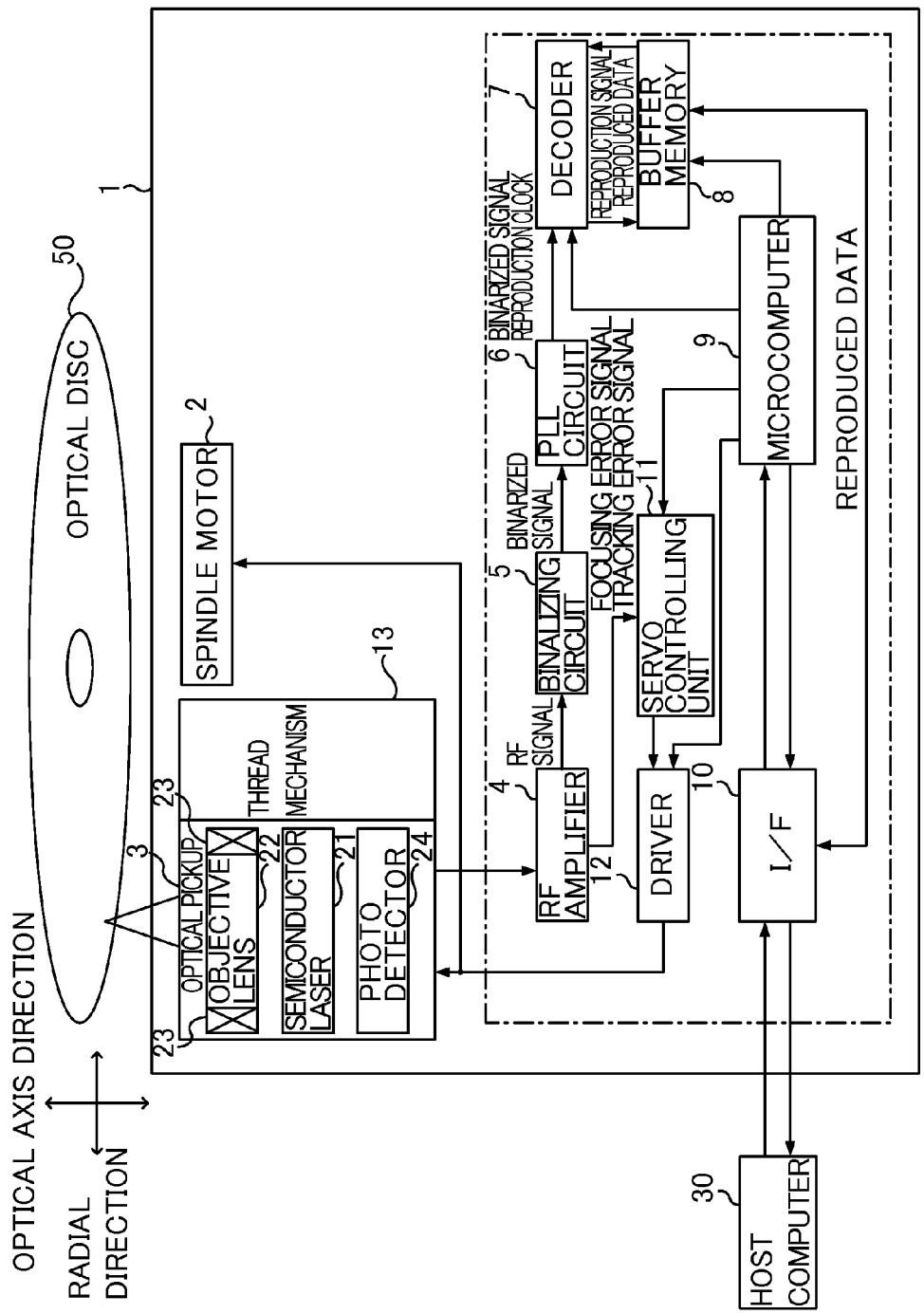
FIG. 1 is a block diagram of the entire configuration of an optical disc apparatus that includes an optical disc reproducing apparatus according to an embodiment of the present invention.
Figure 10:
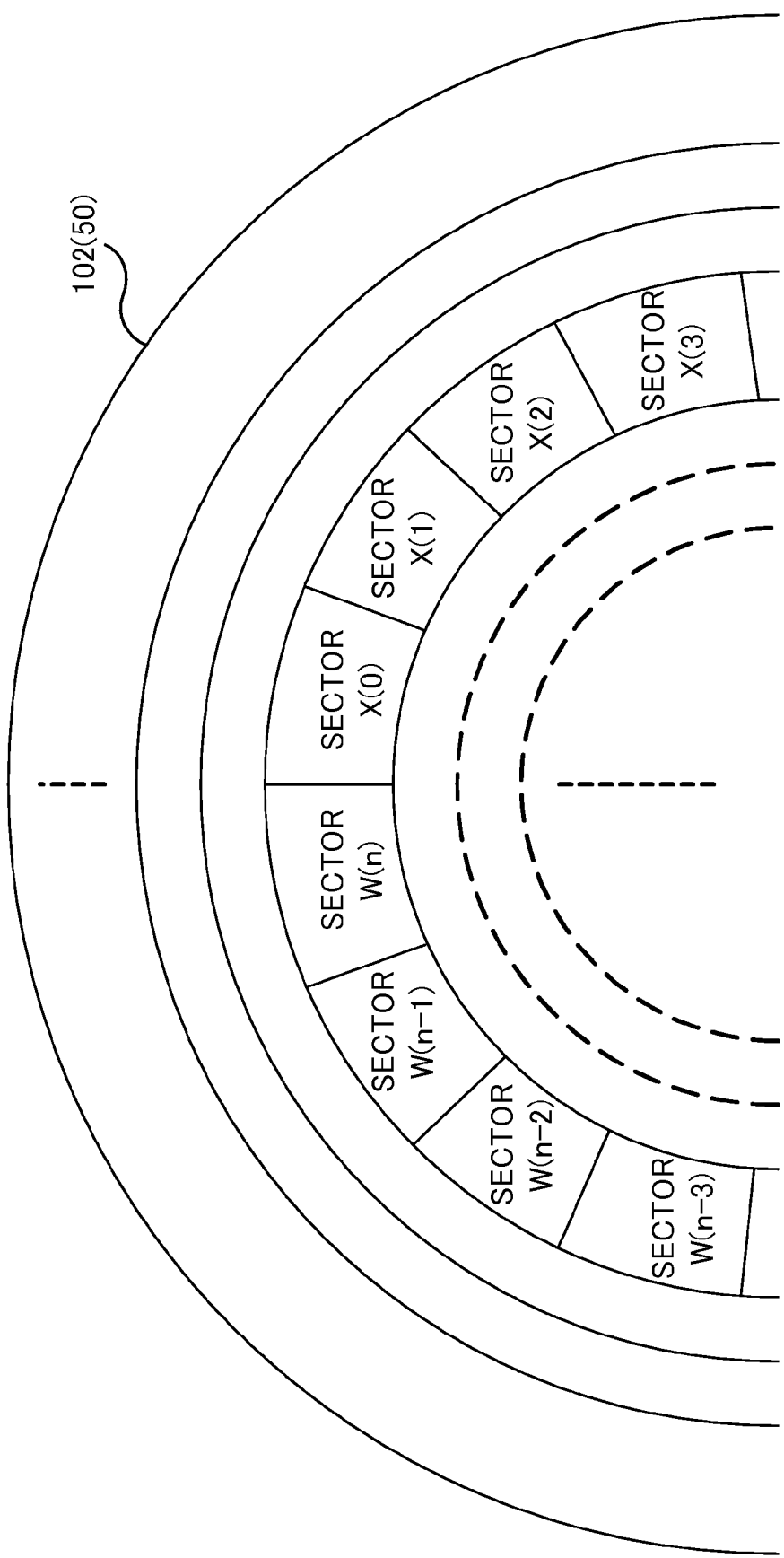
FIG. 10 is a diagram showing sectors of an optical disc.

Referring to FIG. 1, description will be given for the entire configuration of an optical disc apparatus 1 that includes an optical disc reproducing apparatus according to an embodiment of the present invention, referring to FIG. 10 when necessary. FIG. 1 is a block diagram of an example of the entire configuration of an optical disc apparatus 1 that includes an optical disc reproducing apparatus according to an embodiment of the present invention. Though the description will be given assuming that an optical disc 50 is an optical disc of the CD standard in the embodiment, the optical disc reproducing apparatus according to an embodiment of the present invention may be applied to an optical disc of another standard (such as the DVD standard or the Blue-ray Disc (a registered trademark) standard).

The optical disc apparatus 1 includes a spindle motor 2, an optical pickup 3, an RF (Radio Frequency) amplifier 4, a binarizing circuit 5, a PLL (Phase Locked Loop) circuit 6, a decoder 7 (a controlling unit), a buffer memory 8, a microcomputer 9 (a controlling unit, an output unit), an interface (I/F) 10, a servo controlling unit 11, a driver 12, and a thread mechanism 13. The microcomputer 9, the decoder 7, and the buffer memory 8 constitute the optical disc reproducing apparatus according to an embodiment of the present invention. The microcomputer 9 constitutes the controlling unit, the output unit, a determination unit, and a deleting unit. The optical disc apparatus 1 in the embodiment only has the configuration that can reproduce data recorded in sectors (see FIG. 10) of the optical disc 50. However, the configuration is not limited to this and a configuration that can record data into the sectors of the optical disc 50 may be added.

A spindle controlling voltage from the driver 12 is applied to a spindle motor coil not shown and, thereby, the spindle motor 2 rotates at a rotation speed corresponding to the controlling voltage and rotates the optical disc 50 loaded on a chucking mechanism not shown in a predetermined rotation direction.

The thread mechanism 13 includes a main shaft to hold the optical pickup 3, a thread motor, a transmission gear, etc., that are not shown. A thread controlling voltage from the driver 12 is applied to the thread motor and, thereby, the thread mechanism 13 moves the optical pickup 3 in the radial direction of the optical disc 50.

The optical pickup 3 includes a semiconductor laser 21, an objective lens 22, an actuator 23, and a photo detector 24. In the embodiment, other various optical systems (a collimating lens and a polarizing beam splitter), a front monitor diode, etc., included in a general optical pickup, are irrelevant to the purview of the present invention and, therefore, description thereof is omitted.

The semiconductor laser 21 is constituted of a diode formed by creating a PN-junction with a p-type semiconductor and an n-type semiconductor. The semiconductor laser 21 is applied with the controlling voltage from the driver 12 and, thereby, emits a laser light beam that has a wavelength (780 to 790 nm) corresponding to the standard of the optical disc 50 and that has a light intensity that can reproduce data recorded in a sector of the optical disc 50.

The objective lens 22 has a numerical aperture (0.45 to 0.50) corresponding to the standard of the optical disc 50 and is held by a holder not shown that has coils, etc., for tracking servo and focusing servo. The objective lens 22 converges a laser light beam that has passed through and (or) been reflected from various optical systems, onto a sector disposed on a track formed in a spiral in an information recording layer of the optical disc 50. The objective lens 22 converts a reflected light beam of the laser light beam applied to the sector of the optical disc 50 into a substantially-parallel light beam and emits the converted light beam to the various optical systems.

The actuator 23 is constituted of porcelain members (such as a magnet and a yoke) for the tracking servo and the focusing servo, a suspension wire of which one end is anchored to the holder that holds the objective lens 22. The actuator 23 causes the objective lens 22 to move in the optical axis direction using the magnetic action of the porcelain member for the focusing servo and the coil for the focusing servo generated by application of a focusing servo controlling voltage from the driver 12. By executing this focusing servo control, the laser light beam from the objective lens 22 is focused in the information recording layer of the optical disc 50. The actuator 23 causes the objective lens 22 to move in the radial direction of the optical disc 50 using the magnetic action of the porcelain member for the tracking servo and the coil for the tracking servo generated by application of a track jump controlling voltage from the driver 12. Due to the above thread control by the thread mechanism 13 and this track jump control, the objective lens 22 can be moved to a position at which the lens 22 faces the track on which the sector that records data to be read is disposed (hereinafter, "target track") (seeking operation). As a result, the laser light beam from the objective lens 22 is applied to the target track. The actuator 23 causes the objective lens 22 to move in the radial direction of the optical disc 50 using the magnetic action of the porcelain member for the tracking servo and the coil for the tracking servo generated by the application of the tracking servo controlling voltage from the driver 12. By executing this tracking servo control, the laser light beam from the objective lens 22 traces the target track of the optical disc 50.

The photo detector 24 includes, for example, four light-receiving faces not shown formed by equally dividing the entire light-receiving face into four, to receive a reflected light beam of the laser light beam through the various optical systems. The photo detector 24 produces four photo-electrically converted signals respectively corresponding to the light amounts of the reflected light beam of the laser light beam that the four light-receiving faces respectively receive, and outputs those signals to the RF amplifier 4. When the laser light beam from the objective lens 22 is focused on and traces the target track of the optical disc 50, four light-receiving faces of the photo detector 24 receive the reflected light beam of the laser light beam equally in light amount. Therefore, each of the four photo-electrically converted signals output from the photo detector 24 is a signal indicating the same value.

The RF amplifier 4 amplifies by a predetermined gain each of the four photo-electrically converted signals from the photo detector 24 and outputs to the binarizing circuit 5 an RF signal formed in a process of adding the four photo-electrically converted signals. The RF amplifier 4 processes by calculation each of the amplified four photo-electrically converted signals for the focusing servo control and outputs a focus error signal obtained as the result of the calculation process to the servo controlling unit 11. The RF amplifier 4 processes by calculation each of the four amplified photo-electrically converted signals for the tracking servo control and outputs a tracking error signal obtained as the result of the calculation process to the servo controlling unit 11.

The binarizing circuit 5 is constituted of, for example, a comparing circuit and a integrating circuit not shown, and integrates the output of the comparing circuit using the integrating circuit and inputs the integration result into one input of the comparing circuit. Thereby, the slice level is feedback-controlled. The binarizing circuit 5 processes by binarization by the slice level the RF signal to be inputted into the other input of the comparing circuit and outputs the binarized signal obtained as the result of the binarizing process into the PLL circuit 6.

The PLL circuit 6 is constituted of, for example, a phase comparing circuit, a frequency-dividing circuit, a charge pump circuit, a low-pass filter, a VCO (Voltage Controlled Oscillator) circuit, etc., that are not shown. The PLL circuit 6 compares the phases respectively of the binarized signal and a clock at a predetermined frequency, produces a clock of which the phase synchronizes with that of the binarized signal (hereinafter, "reproduction clock"), and outputs the produced clock to the decoder 7 together with the binarized signal.

The decoder 7 detects the level of the binarized signal at, for example, the rise of the reproduction clock based on the control signal from the microcomputer 9, thereby, produces the reproduction signal recorded in the sector of the optical disc 50, and causes the buffer memory 8 to store the reproduction signal. The decoder 7 reads the reproduction signal stored in the buffer memory 8 based on the control signal from the microcomputer 9, applies to the reproduction signal decoding processes such as a decoding process (EFM (Eight Fourteen Modulation)) and an error correcting process (CIRC (Cross Interleaved Reed-Solomon Code) corresponding to the standard of the optical disc 50, and again causes the buffer memory 8 to store reproduced data obtained as the result of the decoding processes.

The buffer memory 8 stores the reproduction signal and the reproduced data from the decoder 7 that are based on the control signals from the microcomputer 9.

The servo controlling unit 11 produces a focusing control signal for the focusing servo control based on the focusing error signal from the RF amplifier 4, and outputs the focusing control signal to the driver 12. The servo controlling unit 11 produces a track jump control signal for the track jump control based on the control signal for the track jump control from the microcomputer 9, and outputs the track jump control signal to the driver 12. The servo controlling unit 11 produces a tracking control signal for the tracking servo control based on the tracking error signal from the RF amplifier 4, and outputs the tracking control signal to the driver 12.

The driver 12 produces a focusing servo controlling voltage based on the focusing control signal from the servo controlling unit 11, and outputs the focusing servo controlling voltage to the actuator 23. The driver 12 produces a thread controlling voltage and outputs the thread controlling voltage to the thread mechanism 13, based on the control signal for the thread control from the microcomputer 9. The driver 12 produces a track jump controlling voltage and outputs the track jump controlling voltage to the actuator 23, based on the track jump control signal from the servo controlling unit 11. The driver 12 produces a tracking controlling voltage and outputs the tracking controlling voltage to the actuator 23, based on the tracking control signal from the servo controlling unit 11. The driver 12 produces a controlling voltage and outputs the controlling voltage to the spindle motor 2, based on the control signal to control the rotation speed of the spindle motor 2 from the microcomputer 9. The driver 12 produces a controlling voltage based on the control signal for controlling the light amount of the laser light beam from the microcomputer 9 to a light amount enabling reproduction, and outputs the controlling voltage to the semiconductor laser 21.

The interface 10 is provided for the host computer 30 (a processing circuit) and the optical disc apparatus 1 that are connected to each other through connecting terminals not shown, to transmit and receive data. Typical interface 10 can be an interface such as the ATAPI (AT Attachment Packet Interface) standard, the SCSI (Small Computer System Interface) standard, the IEEE (Institute of Electrical and Electronic Engineers) 1394 standard, and the USB (Universal Serial Bus) standard.

The microcomputer 9 is constituted of a CPU (Central Processing Unit), a ROM (Read Only Memory), an interface, etc., that are not shown, and supervises and controls the optical disc apparatus 1 based on program data stored in advance in the ROM. The operations, etc., of the microcomputer 9 will be described in detail in the description for the operations of the optical disc apparatus 1 described later.

The configuration excluding the above spindle motor 2 and the optical pickup 3 (enclosed by alternate long and short dashed lines in FIG. 1) can be integrated.

===Operations of Optical Disc Apparatus 1 and Host Computer 30===

Figure 2:
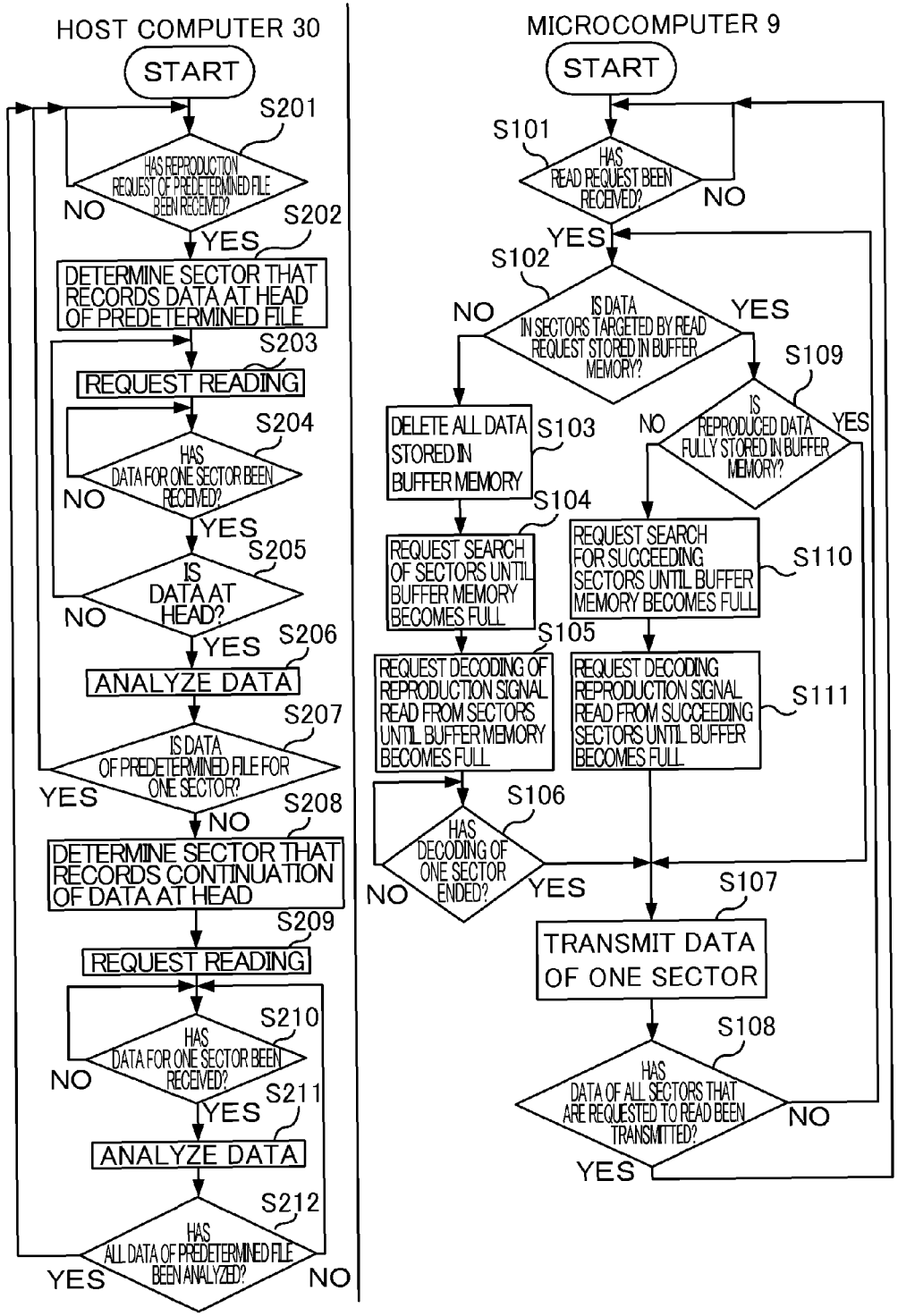
FIG. 2 is a flowchart of operations of a microcomputer and a host computer constituting the optical disc reproducing apparatus according to the embodiment of the present invention.

Referring to FIG. 2, description will be given for the operations of the optical disc apparatus 1 including the optical disc reproducing apparatus according to an embodiment of the present invention, and the host computer 30, referring to FIGS. 1 and 10 when necessary. FIG. 2 is a flowchart of an example of the operations of the microcomputer 9 and the host computer 30 constituting the optical disc reproducing apparatus according to an embodiment of the present invention. Though the description will be given assuming that the host computer 30 reproduces the information based on the reproduced data from the optical disc apparatus 1 in the embodiment, the scheme is not limited to this. For example, a processing circuit that can process the reproduction of the reproduced data may be provided for the optical disc apparatus 1 and the processing circuit may execute a reproducing process based on the reproduced data stored in the buffer memory 8 in response to an instruction signal from the host computer 30.

When the host computer 30 receives a reproduction request for, for example, a predetermined file that represents the information that a user desires to reproduce of the information recorded on the optical disc 50 (S201•YES), the host computer 30 determines a sector (for example, the sector X(0)(the first sector)) of the optical disc 50 that records the data at the head of the predetermined file (S202). In the embodiment, the description will be given assuming that the predetermined file is constituted of the data recorded in the sectors X(0) to X(5). The host computer 30 transmits a "read" request signal that designates the sector X(0) to the optical disc apparatus 1 (S203). Though the host computer 30 first transmits the read request signal that designates one sector (the sector X(0)) in the embodiment), the transmitted signal is not limited to this. A read request signal that designates a plurality of sectors (for example, the sectors X(0) to X(2)) may be transmitted. In this case, a read request signal to be transmitted at S209 described later is a signal that designates sectors X(3) to X(4).

The microcomputer 9 of the optical disc apparatus 1 determines whether the microcomputer 9 has received the read request signal through the interface 10 (S101). When the microcomputer 9 has received the read request signal (S101•YES), the microcomputer 9 determines whether reproduced data read from the sector X(0) that the read request signal designates is stored in the buffer memory 8 (S102).

<<First Operations of Microcomputer 9 and Decoder 7>>

Figure 3:
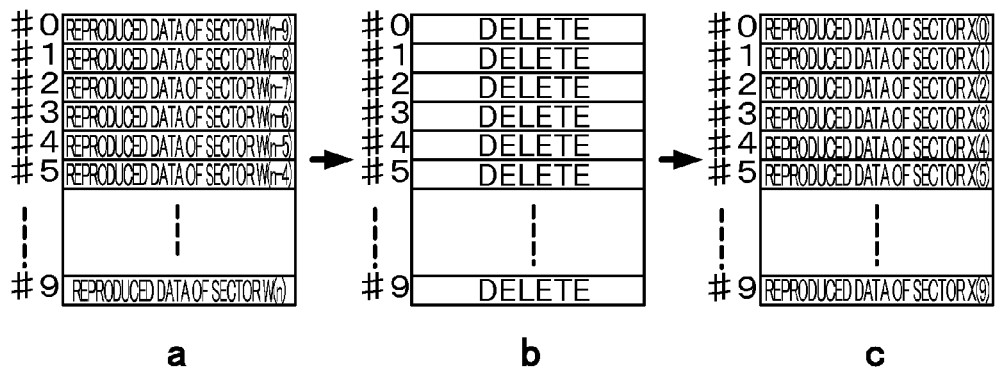
FIG. 3 is a schematic diagram of reproduced data stored in a buffer memory.

Referring to FIG. 3, description will be given for first operations respectively of the microcomputer 9 and the decoder 7 that constitute the optical disc reproducing apparatus according to an embodiment of the present invention, referring to FIGS. 1, 2, and 10 when necessary. FIG. 3 is a schematic diagram of reproduced data stored in the buffer memory 8. The description will be given assuming that, in the first operations, the reproduced data (the data recorded in sectors W(n–9) to W(n)) shown in section a of FIG. 3 is stored in the buffer memory 8.

When the microcomputer 9 determines that the reproduced data read from the sector X(0) is not stored in the buffer memory 8 (S102•NO), the microcomputer 9 deletes all the reproduced data stored in the buffer memory 8 as shown in section b of FIG. 3 (S103). The microcomputer 9 executes the following processes, so as to cause: the reproduced data recorded in each of the sector X(0) and the subsequent sectors; to be stored into all the areas to write into of the buffer memory 8. Hereinafter, the state where the reproduced data is stored in all the areas to write into of the buffer memory 8 is referred to as being "buffer-full".

The microcomputer 9 transmits a control signal for the thread control to the driver 12 to face a track on which the sector X(0), etc., are disposed, of the optical disc 50 and the optical pickup 3 to each other in the optical axis direction, and transmits a control signal for the track jump control to the servo controlling unit 11. The microcomputer 9 transmits a control signal to the driver 12 to cause the semiconductor laser 21 to emit a laser light beam having a sufficient light amount enabling reproduction. The microcomputer 9 transmits a control signal to the driver 12 to cause the spindle motor 2 to rotate at a predetermined rotation speed. The series of above operations of the microcomputer 9 are collectively referred to as "search request" of the microcomputer 9 (S104).

The driver 12 outputs to the spindle motor 2 a spindle controlling voltage based on a control signal for rotating the spindle motor 2. The spindle motor 2 rotates at a predetermined rotation speed by being applied with the spindle controlling voltage, and rotates the optical disc 50 in a predetermined rotation direction. The driver 12 outputs to the thread mechanism 13 a thread controlling voltage based on the control signal for the thread control. The thread controlling voltage is applied to a thread motor and, thereby, the thread mechanism 13 moves the optical pickup 3 in the radial direction of the optical disc 50. The servo controlling unit 11 outputs to the driver 12 a track jump control signal based on the control signal for the track jump control. The drive 12 outputs to the actuator 23 a track jump controlling voltage based on the track jump control signal. The actuator 23 moves the objective lens 22 in the radial direction of the optical disc 50 using the magnetic action generated by the application of the track jump controlling voltage. As a result, the objective lens 22 is moved to a position in the optical axis direction, at which the lens 22 faces the track on which the sector X(0), etc., are disposed. The driver 12 outputs to the semiconductor laser 21 a controlling voltage based on the control signal to emit the laser light beam. The semiconductor laser 21 emits a laser light beam having a wavelength according to the standard of the optical disc 50 and a sufficient light intensity enabling reproduction, by being applied with the controlling voltage from the driver 12. As a result, the laser light beam from the objective lens 22 converges onto a track on which the sector X(0) is disposed, of the optical disc 50.

The reflected light beam of the laser light beam after being applied to the sector X(0) and the succeeding sectors thereof of the optical disc 50 is received by the photo detector 24 through the objective lens 22, etc. The photo detector 24 produces photo-electrically converted signals respectively corresponding to the light amounts of the reflected light beam of the laser light beam that the four light-receiving faces respectively receive, and outputs those signals to the RF amplifier 4. The RF amplifier 4 amplifies by the predetermined gain each of the four photo-electrically converted signals and outputs to the binarizing circuit 5 the RF signal formed by adding the photo-electrically converted signals. The binarizing circuit 5 processes by binarization by the slice level the RF signal and outputs the binarized signal obtained as the result of the binarizing process into the PLL circuit 6. The PLL circuit 6 produces the reproduction clock of which the phase synchronizes with that of the binarized signal, and outputs the produced clock to the decoder 7 together with the binarized signal.

The microcomputer 9 transmits to the decoder 7 a control signal to cause the decoder 7 to execute the production process and the decoding process of the reproduction signal. This operation of the microcomputer 9 is referred to as a "decoding request" of the microcomputer 9 (S105).

The decoder 7 detects the level of the binarized signal at the rise of the reproduction clock based on the control signal from the microcomputer 9, thereby produces the reproduction signal, and causes the buffer memory 8 to store the reproduction signal. The decoder 7 reads the reproduction signal stored in the buffer memory 8 based on the control signal from the microcomputer 9, applies to the reproduction signal decoding processes, and again causes the buffer memory 8 to store the reproduced data recorded in the sector X(0) and the succeeding sectors obtained as the result of the decoding processes. Due to the above rotation of the optical disc 50 and the processes respectively for the blocks, as shown in section c of FIG. 3, the reproduced data read from each of the sector X(0) and the succeeding sectors (in the embodiment, the sectors X(0) to X(9)) with which the buffer memory 8 reaches the state of being buffer-full, is stored in the buffer memory 8.

When the microcomputer 9 determines that the reproduced data (first data) read from the sector X(0) is stored in the buffer memory 8 as a result of the decoding processes by the decoder 7 (S106•YES), the microcomputer 9 reads the reproduced data stored in the buffer memory 8 and transmits the reproduced data to the host computer 30 (S107). The microcomputer 9 determines that the data recorded in all the sectors (the sector X(0)) that the above read request signal designates is transmitted (S108•YES), and returns to S101.

When the host computer 30 receives the reproduced data read from the sector X(0) (S204•YES), the host computer 30 determines whether the reproduced data is the data at the head of the predetermined file (S205). When the host computer 30 determines that the reproduced data is the data at the head (S205•YES), the host computer 30 executes an analyzing process of the reproduced data (S206) and reproduces the information. The host computer 30 determines whether the predetermined file is constituted only of the reproduced data read from the sector X(0) (S207). Because the predetermined file is constituted of the data stored in the sectors X(0) to X(5) as above, the host computer 30 responses to the process at S207 to be NO. The host computer 30 determines the sectors X(1) to X(5) (second sector) of the optical disc 50 that record the remaining portion of the data at the head (S208). The host computer 30 transmits to the optical disc apparatus 1 a read request signal that designates the sectors X(0) to X(5) (S209).

When the microcomputer 9 receives the read request signal (S101•YES), the microcomputer 9 determines whether the reproduced data (the second data) recorded in the sectors X(1) to X(5) that the read request signal designates is stored in the buffer memory 8 (S102). In this case, the buffer memory 8 stores the reproduced data read from the sectors X(0) to X(9) with which the buffer memory 8 becomes buffer-full, due to the above decoding processes by the decoder 7. Therefore, the microcomputer 9 determines that the data recorded in the sectors X(1) to X(5) that the read request signal designates is stored in the buffer memory 8 (S102•YES). When the microcomputer 9 determines that the reproduced data is stored in the buffer memory 8 reaching the state of being buffer-full (S109•YES), the microcomputer 9 reads from the buffer memory 8 the reproduced data read from the sector X(1), and transmits the reproduced data to the host computer 30 (S107). When the microcomputer 9 determines that the data recorded in all the sectors (the sectors X(1) to X(5)) that the read request signal designates has not been transmitted (S108•NO), the microcomputer 9 returns to S102. By repeating the above processes, the reproduced data read from the sector X(2) stored in the buffer memory 8 is sequentially transmitted to the host computer 30. When the microcomputer 9 reads from the buffer memory 8 the reproduced data read from the sector X(5) and transmits the reproduced data to the host computer 30 (S107), the microcomputer 9 determines that the data recorded in all the sectors (the sectors X(1) to X(5)) that the read request signal designates has been transmitted (S108•YES) and returns to S101.

When the host computer 30 receives the reproduced data read from the sector X(1) by the above operations of the microcomputer 9 (S210•YES), the host computer 30 executes an analyzing process of the reproduced data (S211). When the host computer 30 determines that the host computer 30 has not processed by analyzing all the data (the data recorded in the sectors X(0) to X(5)) of the predetermined file (S212•NO), the host computer 30 returns to S210. The above processes are repeated by sequentially receiving the reproduced data read from the sector X(2) from the microcomputer 9 and the host computer 30 determines that the host computer 30 has processes by analyzing all the data of the predetermined file (S212•YES) and returns to S201. As a result, the host computer 30 executes a reproducing process based on the reproduced data read from the sectors X(0) to X(5) and the reproduction of the information that the user desires is executed.

<<Second Operations of Microcomputer 9 and Decoder 7>>

Figure 4:
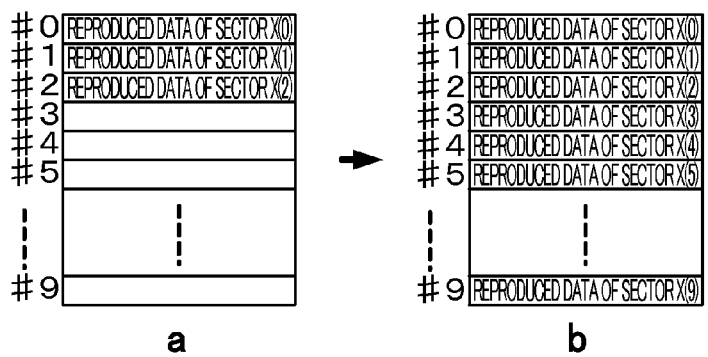
FIG. 4 is a schematic diagram of reproduced data stored in the buffer memory.

Referring to FIG. 4, description will be given for second operations respectively of the microcomputer 9 and the decoder 7 that constitute the optical disc reproducing apparatus, referring to FIGS. 1, 2, and 10 when necessary. FIG. 4 is a schematic diagram of the reproduced data stored in the buffer memory 8. For the second operations, description will be given assuming that, in the determination at S102, the reproduced data shown in section a of FIG. 4 (the data recorded in the sectors X(0) to X(2)) is already stored in the buffer memory 8.

When the microcomputer 9 determines that the reproduced data read from the sector X(0) is stored in the buffer memory 8 (S102•YES), the microcomputer 9 determines whether the reproduced data is stored in the buffer memory 8 to the extent of being buffer-full (S109). When the microcomputer 9 determines that the reproduced data is not stored in the buffer memory 8 to the extent of being buffer-full (S109•NO), the microcomputer 9 executes the same processes as the above search request and the decoding request to cause the buffer memory 8 to store the data recorded in the sector X(3) and the succeeding sectors thereof to the extent of being buffer-full (S110, S111). Due to the above rotation of the optical disc 50 and the processes by the blocks, as shown in section b of FIG. 4, the reproduced data read from the sector X(3) and the succeeding sectors thereof (in the embodiment, the sectors X(3) to X(9)) is stored in the buffer memory 8 together with the reproduced data of the sectors X(0) to X(2) that are already stored. The microcomputer 9 reads the reproduced data recorded in the sector X(0) stored in the buffer memory 8 and transmits the reproduced data to the host computer 30 (S107). The transmission and reception of the data between the host computer 30 and the optical disc apparatus 1 described for the first operations are executed similarly and, thereby, the reproduced data read from the sectors X(1) to X(5) is transmitted to the host computer 30. As a result, the host computer 30 determines that all the data of the predetermined file is processed by analyzing the data (S212•YES) and executes a reproducing process based on the reproduced data read from the sectors X(0) to X(5). As a result, the information that the user desires is reproduced.

<<Third Operations of Microcomputer 9 and Decoder 7>>

Figure 5:
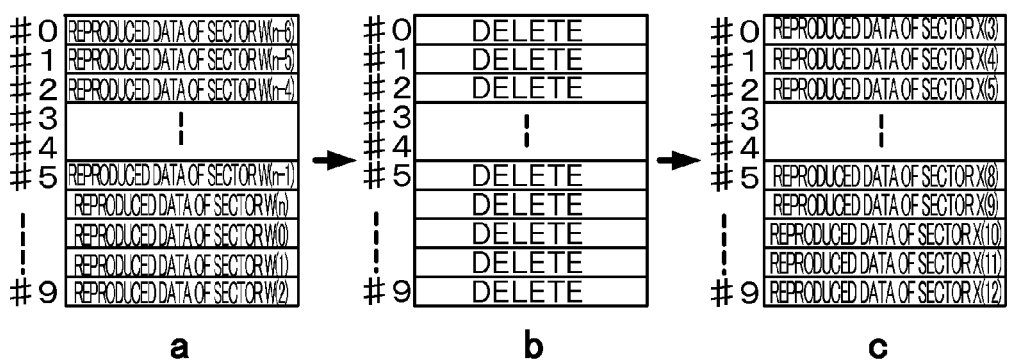
FIG. 5 is a schematic diagram of reproduced data stored in the buffer memory.

Referring to FIG. 5, description will be given for third operations respectively of the microcomputer 9 and the decoder 7 that constitute the optical disc reproducing apparatus according to an embodiment of the present invention, referring to FIGS. 1, 2, and 10 when necessary. FIG. 5 is a schematic diagram of the reproduced data stored in the buffer memory 8. For the third operations, description will be given assuming that, in the determination at S102, the reproduced data shown in section a of FIG. 5 (the data recorded in the sectors W(n–6) to X(2)) is already stored in the buffer memory 8.

When the microcomputer 9 determines that the reproduced data read from the sector X(0) is stored in the buffer memory 8 (S102•YES), the microcomputer 9 determines whether the reproduced data is stored in the buffer memory 8 to the extent of being buffer-full (S109). When the microcomputer 9 determines that the reproduced data is stored in the buffer memory

8 to the extent of being buffer-full (S109•YES), the microcomputer 9 reads the reproduced data recorded in the sector X(0) stored in the buffer memory 8 and transmits the reproduced data to the host computer 30 (S107). The microcomputer 9 determines that the data recorded in all the sectors (the sector X(0)) that the above read request signal designates is transmitted (S108•YES), and returns to S101.

When the host computer 30 receives the reproduced data read from the sector X(0) (S204•YES), the host computer 30 executes the above processes executed at S205 to S208 and transmits to the optical disc apparatus 1 a read request signal that designates the sectors X(1) to X(5).

When the microcomputer 9 receives the read request signal (S101•YES), the microcomputer 9 determines whether the data recorded in the sectors X(1) to X(5) that the read request signal designates is stored in the buffer memory 8 (S102). In this case, the buffer memory 8 stores the reproduced data recorded in the sectors X(1) and X(2) of the sectors X(1) to X(5) that the read request signal designates. Therefore, the microcomputer 9 determines that the buffer memory 8 stores the reproduced data recorded in the sectors X(1) and X(2) of the sectors X(1) to X(5) that the read request signal designates (S102•YES). When the microcomputer 9 determines that the reproduced data is stored in the buffer memory 8 reaching the extent of being buffer-full (S109•YES), the microcomputer 9 reads from the buffer memory 8 the reproduced data read from the sector X(1), and transmits the reproduced data to the host computer 30 (S107). When the microcomputer 9 determines that the data recorded in all the sectors (the sectors X(1) to X(5)) that the read request signal designates has not been transmitted (S108•NO), the microcomputer 9 returns to S102. By repeating the above processes, the reproduced data read from the sector X(2) stored in the buffer memory 8 is transmitted to the host computer 30.

At S102 after transmitting the reproduced data read from the sector X(2), the microcomputer 9 determines whether the data recorded in the sectors X(1) to X(5) is stored in the buffer memory 8. In this case, the buffer memory 8 does not store the reproduced data recorded in the sectors X(3) to X(5) of the sectors X(1) to X(5) that the read request signal designates. Therefore, the microcomputer 9 determines that the buffer memory 8 does not store the reproduced data recorded in the sectors X(3) to X(5) of the sectors X(1) to X(5) that the read request signal designates (S102•NO). The microcomputer 9 deletes all the reproduced data stored in the buffer memory 8 as shown in section b of FIG. 5 (S103). The microcomputer 9 executes the above search request and the decoding request to cause the buffer memory 8 to store the data recorded in the sector X(3) and the succeeding sectors thereof to the extent of being buffer-full (S104, S105). Due to the above rotation of the optical disc 50 and the processes by the blocks, as shown in section c of FIG. 5, the reproduced data read from the sector X(3) and the succeeding sectors thereof (in the embodiment, the sectors X(3) to X(12)) with which the buffer memory 8 becomes buffer-full is stored in the buffer memory 8.

When the microcomputer 9 determines that the reproduced data read from the sector X(3) is stored in the buffer memory 8 as a result of the decoding processes by the decoder 7 (S106•YES), the microcomputer 9 reads the reproduced data stored in the buffer memory 8 and transmits the reproduced data to the host computer 30 (S107). The microcomputer 9 determines that the data recorded in all the sectors (the sectors X(0) to X(5)) that the above read request signal designates is not transmitted (S108•NO) and returns to S102. By repeating the above processes, the reproduced data read from the sector X(4) stored in the buffer memory 8 is sequentially transmitted to the host computer 30. When the microcomputer 9 reads from the buffer memory 8 the reproduced data read from the sector X(5) and transmits the reproduced data to the host computer 30 (S107), the microcomputer 9 determines that the data recorded in all the sectors (the sectors X(1) to X(5)) that the read request signal designates has been transmitted (S108•YES) and returns to S101. As a result, the host computer 30 determines that all the data of the predetermined file is processed by analyzing the data (S212•YES) and executes the reproducing process based on the reproduced data read from the sectors X(0) to X(5), and the information that the user desires is reproduced.

<<Fourth Operations of Microcomputer 9 and Decoder 7>>

Figure 6:
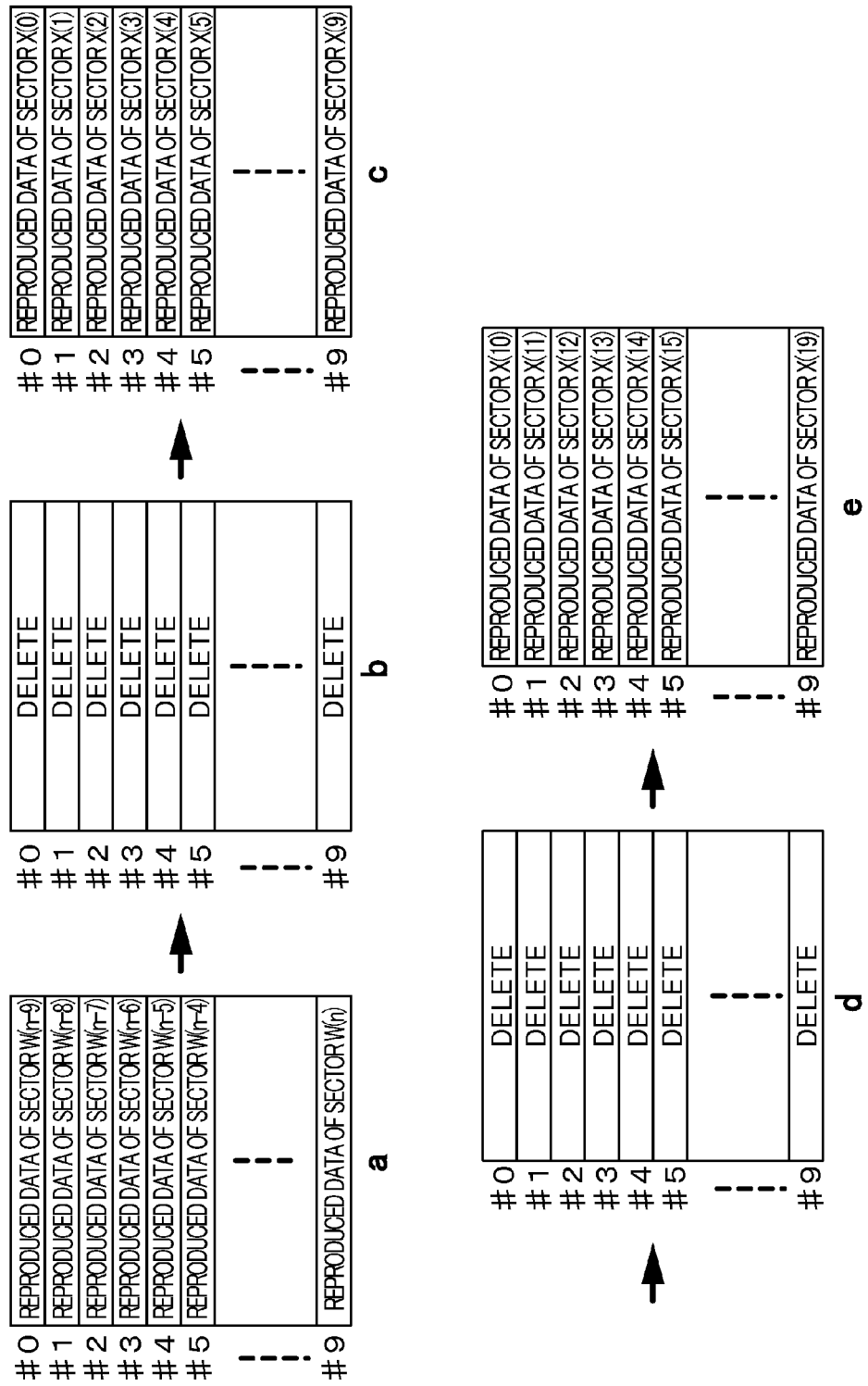
FIG. 6 is a schematic diagram of reproduced data stored in the buffer memory.

Referring to FIG. 6, description will be given for fourth operations respectively of the microcomputer 9 and the decoder 7 that constitute the optical disc reproducing apparatus according to an embodiment of the present invention, referring to FIGS. 1, 2, and 10 when necessary. FIG. 6 is a schematic diagram of the reproduced data stored in the buffer memory 8. For the fourth operations, description will be given assuming that, in the determination at S102, the reproduced data shown in section a of FIG. 6 (the data recorded in the sectors W(n−9) to W(n)) is already stored in the buffer memory 8. In the fourth operations, description will be given assuming that a predetermined file is constituted of data recorded in the sectors X(0) to X(13) of which the amount is larger than the data amount (the data recorded in 10 sectors) that the buffer memory 8 can record.

When the microcomputer 9 determines that the reproduced data read from the sector X(0) is not stored in the buffer memory 8 (S102•NO), the microcomputer 9 deletes all the reproduced data stored in the buffer memory 8 as shown in section b of FIG. 6 (S103). The microcomputer 9 executes the above search request and the decoding request to cause the buffer memory 8 to store the data recorded in the sector X(0) and the succeeding sectors thereof to the extent of being buffer-full (S104, S105). Due to the above rotation of the optical disc 50 and the processes by the blocks, as shown in section c of FIG. 6, the reproduced data read from the sector X(0) and the succeeding sectors thereof (in the embodiment, the sectors X(0) to X(9)) with which the buffer memory 8 becomes buffer-full is stored in the buffer memory 8.

When the microcomputer 9 determines that the reproduced data read from the sector X(0) is stored in the buffer memory 8 as a result of the decoding processes by the decoder 7 (S106•YES), the microcomputer 9 reads the reproduced data stored in the buffer memory 8 and transmits the reproduced data to the host computer 30 (S107). The microcomputer 9 determines that the data recorded in all the sectors (the sectors X(0)) that the above read request signal designates is transmitted (S108•YES), and returns to S101.

When the host computer 30 receives the reproduced data read from the sector X(0) (S204•YES), the host computer 30 executes the processes at the above S205 to S208 and transmits a read request signal that designates the sectors X(1) to X(13) to the optical disc apparatus 1.

When the microcomputer 9 has received the read request signal (S101•YES), the microcomputer 9 determines whether the data (second data) recorded in the sectors X(1) to X(13) that the read request signal designates is stored in the buffer memory 8 (S102). In this case, the buffer memory 8 stores the reproduced data recorded in the sectors X(1) to X(9) of the sectors X(1) to X(13) that the read request signal designates. Therefore, the microcomputer 9 determines that the reproduced data recorded in the sectors X(1) to X(9) of the sectors X(1) to X(13) that the read request signal designates is stored in the buffer memory 8 (S102•YES). When the microcomputer 9 determines that the reproduced data is stored in the buffer memory 8 reaching the state of being buffer-full (S109•YES), the microcomputer 9 reads from the buffer memory 8 the reproduced data read from the sector X(1), and transmits the reproduced data to the host computer 30 (S107). When the microcomputer 9 determines that the data recorded in all the sectors (the sectors X(1) to X(13)) that the read request signal designates has not been transmitted (S108•NO), the microcomputer 9 returns to S102. By repeating the above processes, the reproduced data read from the sector X(2) stored in the buffer memory 8 is sequentially transmitted to the host computer 30.

At S102 after transmitting the reproduced data read from the sector X(9), the microcomputer 9 determines whether the data recorded in the sectors X(1) to X(13) is stored in the buffer memory 8 (S102). In this case, the buffer memory 8 does not store the reproduced data recorded in the sectors X(10) to X(13) of the sectors X(1) to X(13) that the read request signal designates. Therefore, the microcomputer 9 determines that the buffer memory 8 does not store the reproduced data recorded in the sectors X(10) to X(13) of the sectors X(1) to X(13) that the read request signal designates (S102•NO). The microcomputer 9 deletes all the reproduced data stored in the buffer memory 8 as shown in section d of FIG. 6 (S103). The microcomputer 9 executes the above search request and the decoding request to cause the buffer memory 8 to store the data recorded in the sector X(10) and the succeeding sectors thereof to the extent of being buffer-full (S104, S105). Due to the above rotation of the optical disc 50 and the processes by the blocks, as shown in section e of FIG. 6, the reproduced data read from the sector X(10) and the succeeding sectors thereof (in the embodiment, the sectors X(10) to X(19)) with which the buffer memory 8 becomes buffer-full is stored in the buffer memory 8.

When the microcomputer 9 determines that the reproduced data read from the sector X(10) is stored in the buffer memory 8 as a result of the decoding process by the decoder 7 (S106•YES), the microcomputer 9 reads the reproduced data stored in the buffer memory 8 and transmits the reproduced data to the host computer 30 (S107). The microcomputer 9 determines that the data recorded in all the sectors (the sectors X(0) to X(13)) that the above read request signal designates is not transmitted (S108•NO), and returns to S102. By repeating the above processes, the reproduced data read from the sector X(11) stored in the buffer memory 8 is sequentially transmitted to the host computer 30. When the microcomputer 9 reads from the buffer memory 8 the reproduced data read from the sector X(13) and transmits the reproduced data to the host computer 30 (S107), the microcomputer 9 determines that the data recorded in all the sectors (the sectors X(1) to X(13)) that the read request signal designates has been transmitted (S108•YES), and returns to S101. As a result, the host computer 30 determines that all the data of the predetermined file is processed by analyzing the data (S212•YES) and executes the reproducing process based on the reproduced data read from the sectors X(0) to X(13), and the information that the user desires is reproduced.

In the above embodiment, based on the read request signal that designates the sector X(0), the microcomputer 9 and the decoder 7 cause the buffer memory 8 to store the data recorded in the sectors (the sectors X(1), X(2), . . . ) that sequentially succeed the sector X(0), however, the storage is not limited to this. For example, the microcomputer 9 and the decoder 7 may cause the buffer memory 8 to store the reproduced data read from the even-numbered sectors (the sectors X(2), X(4), . . . ) starting with the sector X(0) based on the read request signal that designates the sector X(0). Otherwise, the microcomputer 9 and the decoder 7 may cause the buffer memory 8 to store the reproduced data read from random-numbered sectors. In this manner, the reproduced data may be read from the sectors X(1) to X(5) after the sector X(0). According to this, generally, in the reproduction of the information from the optical disc 50, the reproduction of the information is executed by reading the reproduction data from the sectors lining in a spiral from the sectors on the inner circumference to the outer circumference. By reading the reproduced data from the sectors X(1) to X(5) after the sector X(0), it becomes possible to output the reproduced data read from the sectors X(1) to X(5) to the host computer 30 without outputting thereto the reproduced data read from the sector before the sector X(0) (for example, the sector W(n)), after outputting thereto the reproduced data read from the sector X(0). Therefore, excellent reproduction of the information can be executed.

According to the above embodiment, when the sectors X(1) to X(5) of the sectors of the optical disc 50 are designated, it becomes possible to transmit to the host computer 30 the reproduced data read from the sectors X(1) to X(5) already stored in the buffer memory 8, and to execute the reproduction process of the information in the host computer 30 without any delay. That is, when the request signal from the host computer 30 designating the sectors X(1) to X(5) is received (S101•YES), the reproduced data read from the sectors X(1) to X(5) can be transmitted without moving the optical pickup 3 and the objective lens 22 in the radial direction of the optical disc 50. As a result, in addition to the time necessary for moving the optical pickup 3 and the objective lens 22, the time necessary for the decoding processes of the decoder 7 can be omitted. Therefore, excellent reproduction of the information can be executed without discontinuing, etc., the reproducing process in the host computer 30.

When the buffer memory 8 does not store the reproduced data read from the sectors designated by the read request signal, the reproduced data stored in the buffer memory 8 can be deleted. As a result, the buffer memory 8 can store more reproduced data and the buffer memory 8 can more securely store all the data read from the sectors X(0) to X(5) that the read request signal designates.

In all the areas to write into of the buffer memory 8, the reproduced data read from the sectors X(0) to X(9) can be stored. As a result, the possibility becomes higher that the buffer memory 8 stores the reproduced data read from the sectors X(1) to X(5) that the read request signal designates. Therefore, the reproduced data read from the sectors X(1) to X(5) can be more securely outputted for the read request signal.

For example, when the reproduced data read from the sector X(0) and the reproduced data read from the sectors X(1) to X(5) are music data where music information is reproduced by sequential reproduction process thereof, the reproduced data read from the sector X(0) and the reproduced data read from the sectors X(1) to X(5) can be sequentially transmitted to the host computer 30. As a result, a process to reproduce excellent music information can be executed in the host computer 30 without discontinuing the music information.

A program data to define the above operations of the microcomputer 9 can be processed as software by for example:

storing in advance in a recording medium such as a ROM constituting the microcomputer 9; reading; and processing the program data.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

<<Control of Data Amount Recorded in Sectors Recorded in Buffer Memory>>

Figure 7:
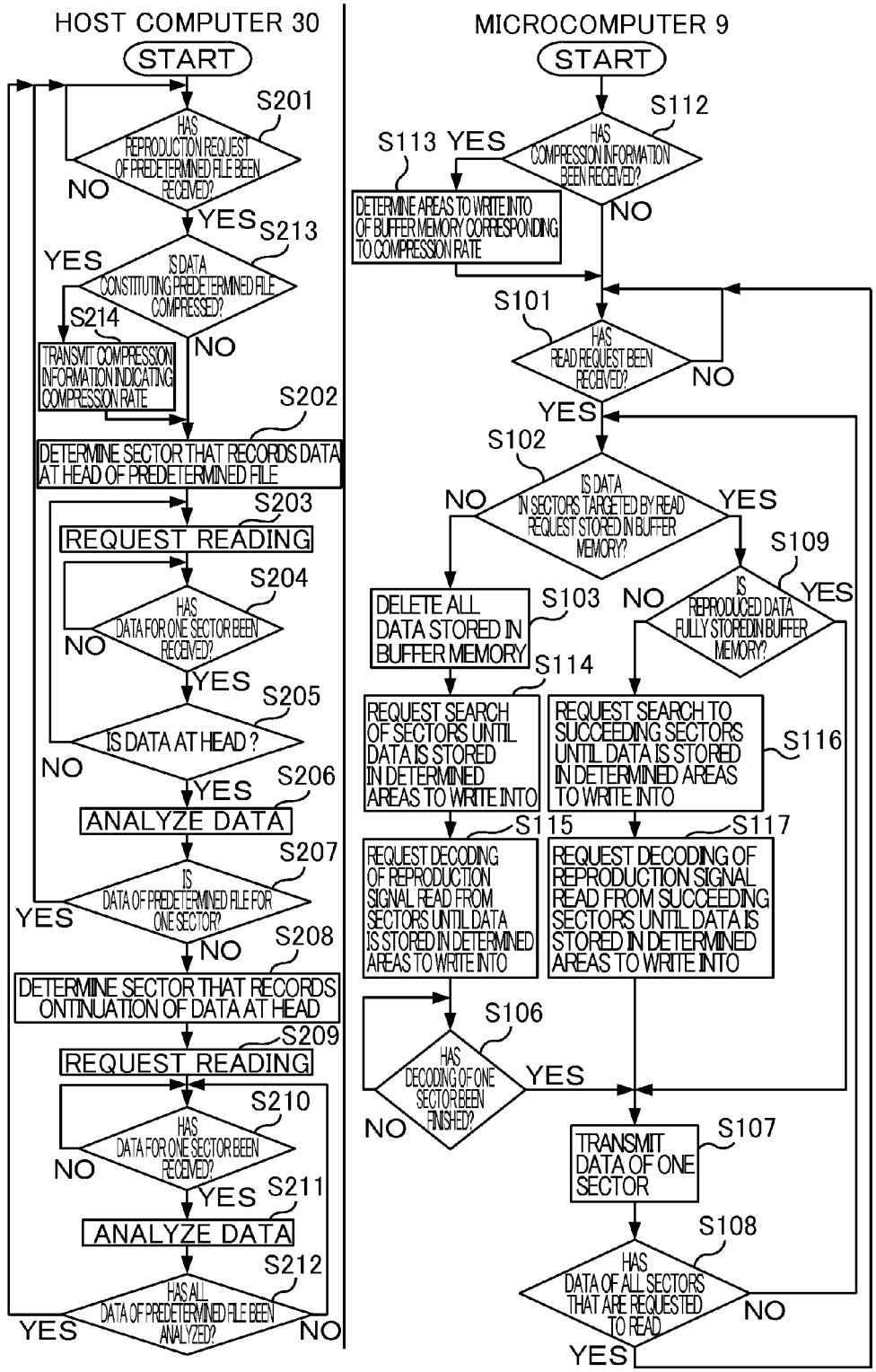
FIG. 7 is a flowchart of other operations of the microcomputer and the host computer constituting the optical disc reproducing apparatus according to the embodiment of the present invention.
Figure 8:
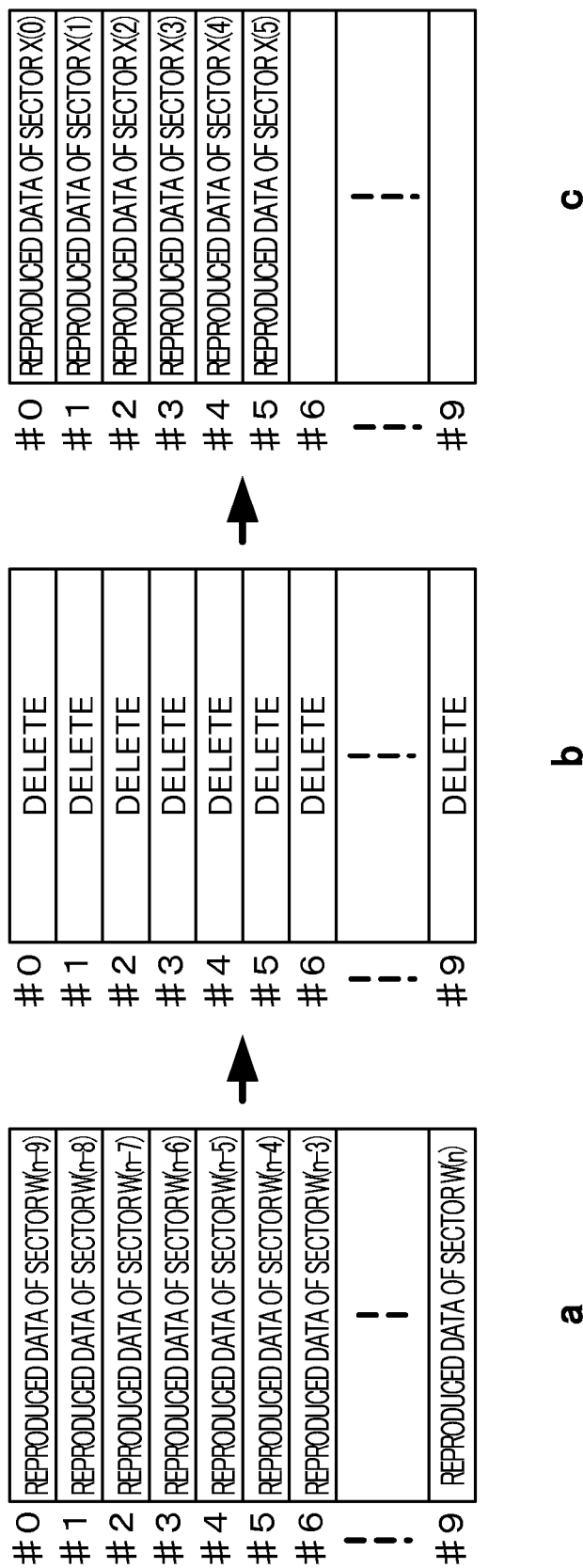
FIG. 8 is a schematic diagram of reproduced data stored in the buffer memory.
Figure 9:
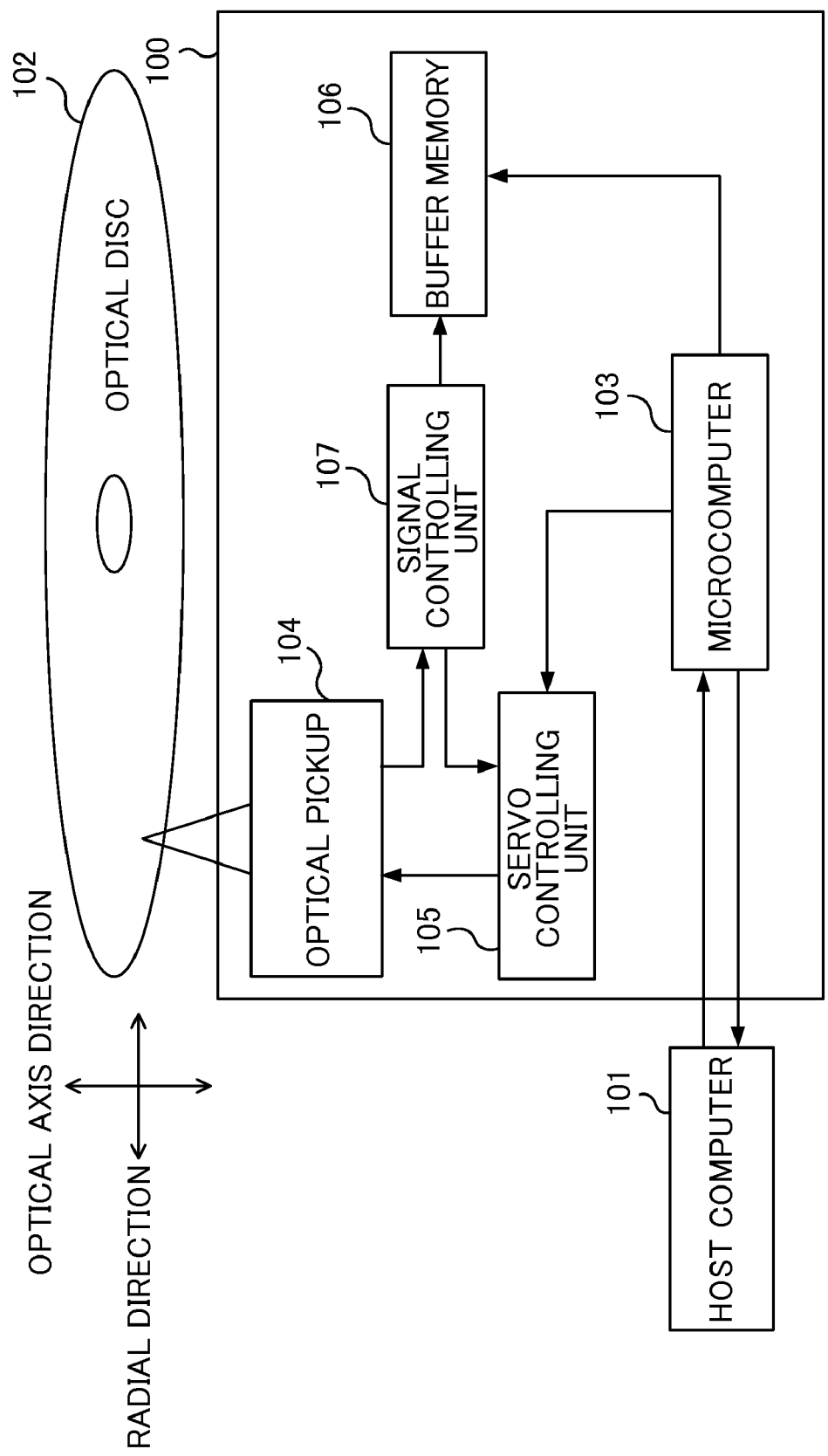
FIG. 9 is a block diagram of the entire configuration of the optical disc apparatus.

According to the above embodiments, the microcomputer 9 causes the buffer memory 8 to store the data recorded in the sector X(0) and the succeeding sectors thereof to the extent of being buffer-full, however, the storage is not limited to this. For example, when the data recorded in the sectors X(0) to X(5) constituting a predetermined file is compressed data such as MP3 (MPEG (Moving Picture Experts Group) Audio Layer-3), the buffer memory 8 may not store the reproduced data to the extent of being buffer-full. Referring to FIGS. 7 and 8, description will be given in detail. FIG. 7 is a flowchart of other operations of the microcomputer 9 and the host computer 30 constituting the optical disc reproducing apparatus according to an embodiment of the present invention. When the operations shown in FIG. 7 are same as those shown in FIG. 1, the same reference numerals are given and the description thereof is omitted. FIG. 8 is a schematic diagram of reproduced data stored in the buffer memory 8.

When the host computer 30 receives a reproduction request of a predetermined file (S201•YES), the host computer 30 determines whether the data constituting the predetermined file (the sectors X(0) to X(5)) is compressed data (S213). When the host computer 30 determines that the data constituting the predetermined file is compressed data (S213•YES), the host computer 30 transmits to the optical disc apparatus 1 compression information designating the compression rate of the compressed data (S214).

When the microcomputer 9 of the optical disc apparatus 1 receives the compression information from the host computer 30 (S112•YES), the microcomputer 9 determines the areas to write into of the buffer memory 8 to store the compressed reproduced data corresponding to the compression rate. Describing in detail, when the reproduced data is not compressed, the microcomputer 9 determines such that the data to be stored in the areas to write into having 10 addresses (above embodiments) is stored as the reproduced data in, for example, the areas to write into having six addresses based on the compression information. That is, the microcomputer 9 determines the areas to write into of the buffer memory 8 such that the buffer memory 8 stores only the data read from the six sectors.

The microcomputer 9 determines whether the microcomputer 9 has received any read request signal through the interface 10 (S101). When the microcomputer 9 receives the read request signal (S101•YES), the microcomputer 9 determines whether the buffer memory 8 stores the reproduced data read from the sector X(0) that the read request signal designates (S102). When the microcomputer 9 determines that the buffer memory 8 does not store the reproduced data read from the sector X(0) (S102•NO), as shown in section b of FIG. 8, the microcomputer 9 deletes all the reproduced data stored in the buffer memory 8 (S103). The microcomputer 9 executes the search request and the decoding request to cause the buffer memory 8 to store the data recorded in the sector X(0) and the succeeding sectors to the extent of being buffer-full (S114, S115).

The storage of the reproduced data to the buffer memory 8 executed in response to the search request and the decoding request of the microcomputer 9 is, as above, defined by the microcomputer 9 such that the buffer memory 8 stores only the data recorded in six sectors. Therefore, the buffer memory 8 stores the reproduced data read from the sectors X(0) to X(5) (section c of FIG. 8). The above processes are executed based on the reproduced data read from the sectors X(0) to X(5) stored in the buffer memory 8. At S116 and S117, the buffer memory 8 similarly stores the data read from the six sectors.

According to the above embodiment, the areas to write into of the buffer memory 8 can be determined corresponding to the compression rate. As a result, blank areas occurred to the buffer memory 8 can be used for other uses, etc., (for example, to store the reproduced signal before execution of the decoding process).

It is claimed:

1. An optical disc reproducing apparatus comprising:
   a buffer memory configured to store data read from sectors of an optical disc;
   a determination unit configured to determine whether first data read from a first sector of the sectors is stored in the buffer memory when the first sector is designated;
   a deleting unit configured to delete all of the data stored in the buffer memory based on a determination result of the determination unit indicating that the first data is not stored in the buffer memory;
   a controlling unit configured to cause the buffer memory to store the first data and second data read from a second sector other than the first sector after the deleting unit has deleted all of the data stored in the buffer memory; and
   an output unit configured to
      output the first data stored in the buffer memory to a processing circuit configured to reproduce the information when the first sector of the sectors is designated, and thereafter
      output the second data stored in the buffer memory to the processing circuit when the second sector of the sectors is designated.

2. The optical disc reproducing apparatus of claim 1, wherein:
   the buffer memory has a storage capacity that is larger than a data amount of the first data, and wherein
   the controlling unit causes the second data to be stored in all areas to write into other than an area to write into of the buffer memory in which the first data is stored.

3. The optical disc reproducing apparatus of claim 1, wherein
   the first data and the second data are data that are compressed at a predetermined compression rate, and wherein
   based on compression information indicating the predetermined compression rate, the controlling unit determines the area to write into of the buffer memory to store the first data and the second data, corresponding to the predetermined compression rate.

4. The optical disc reproducing apparatus of claim 1, wherein
   the second sector is a sector from which the second data is read after the first data has been read from the first sector.

5. The optical disc reproducing apparatus of claim 1, wherein the second sector is a sector from which the second data is read sequentially after the first data has been read from the first sector.

6. A non-transient recording medium having stored thereon a program which, when executed by a computer controlling an optical disc reproducing apparatus including a buffer memory configured to store data read from sectors of an optical disc, causes the computer to perform actions comprising:

determining whether first data read from a first sector of the sectors is stored in the buffer memory when the first sector is designated;

deleting all of the data stored in the buffer memory based on a determination that the first data is not stored in the buffer memory;

causing the buffer memory to store the first data read from a first sector and second data read from a second sector other than the first sector after deleting all of the data stored in the buffer memory; and outputting the first data stored in the buffer memory to a processing circuit configured to reproduce the information when the first sector of the sectors is designated, and thereafter outputting the second data stored in the buffer memory to the processing circuit when the second sector of the sectors is designated.

7. A method of reading data in a processor controlling an optical disc reproducing apparatus including a buffer memory configured to store data read from sectors of an optical disc, comprising:

determining whether first data read from a first sector of the sectors is stored in the buffer memory when the first sector is designated;

deleting all of the data stored in the buffer memory based on a determination that the first data is not stored in the buffer memory;

causing the buffer memory to store the first data read from a first sector and second data read from a second sector other than the first sector after deleting all of the data stored in the buffer memory; and outputting the first data stored in the buffer memory to a processing circuit configured to reproduce the information when the first sector of the sectors is designated, and thereafter outputting the second data stored in the buffer memory to the processing circuit when the second sector of the sectors is designated.

* * * * *